United States Patent
Nishikawa

(10) Patent No.: US 8,213,189 B2
(45) Date of Patent: Jul. 3, 2012

(54) RESONANCE-TYPE POWER SUPPLY WITH IMPROVED CONVERTION EFFICIENCY

(75) Inventor: Yukihiro Nishikawa, Hino (JP)

(73) Assignee: Fuji Electric Co., Ltd., Kawasaka-Shi (JP)

( * ) Notice: Subject to any disclaimer, the term of this patent is extended or adjusted under 35 U.S.C. 154(b) by 444 days.

(21) Appl. No.: 12/453,185

(22) Filed: May 1, 2009

(65) Prior Publication Data
US 2009/0284991 A1    Nov. 19, 2009

(30) Foreign Application Priority Data
May 14, 2008    (JP) .................................. 2008-127545

(51) Int. Cl.
*H02M 3/335*    (2006.01)

(52) U.S. Cl. .................................................... 363/21.02

(58) Field of Classification Search ............... 363/21.02, 363/21.07, 21.09, 21.1, 21.11, 21.15, 21.18
See application file for complete search history.

(56) References Cited

U.S. PATENT DOCUMENTS

| | | | | |
|---|---|---|---|---|
| 5,977,530 A | * | 11/1999 | Bessho et al. | 219/715 |
| 6,236,169 B1 | * | 5/2001 | Burtscher et al. | 315/291 |
| 7,911,812 B2 | * | 3/2011 | Colbeck et al. | 363/21.02 |

FOREIGN PATENT DOCUMENTS

| | | |
|---|---|---|
| JP | H06-030557 | 2/1994 |
| JP | H07-255169 | 10/1995 |
| JP | 2001-314079 | 11/2001 |
| JP | 2006-204044 | 8/2006 |

* cited by examiner

*Primary Examiner* — Adolf Berhane
*Assistant Examiner* — Yemane Mehari
(74) *Attorney, Agent, or Firm* — Manabu Kanesaka

(57) ABSTRACT

A switching power supply includes a control circuit controlling ON and OFF of switching devices Q1 and Q2 and having an error amplifying circuit that controls a DC output voltage at a constant preset value, an oscillator circuit that controls the switching frequency in response to the output signal level FB of an error amplifying circuit, and a pulse width control circuit PWM that controls the pulse width in response to the output signal such that the ON-periods of switching devices Q1 and Q2 are equal to each other. The ON and OFF of switching devices Q1 and Q2 is controlled based on the output from oscillator circuit VCO when the output signal is higher than a threshold level. The switching frequency is fixed when the output signal level FB is lower than the threshold level.

14 Claims, 9 Drawing Sheets

Fig. 5
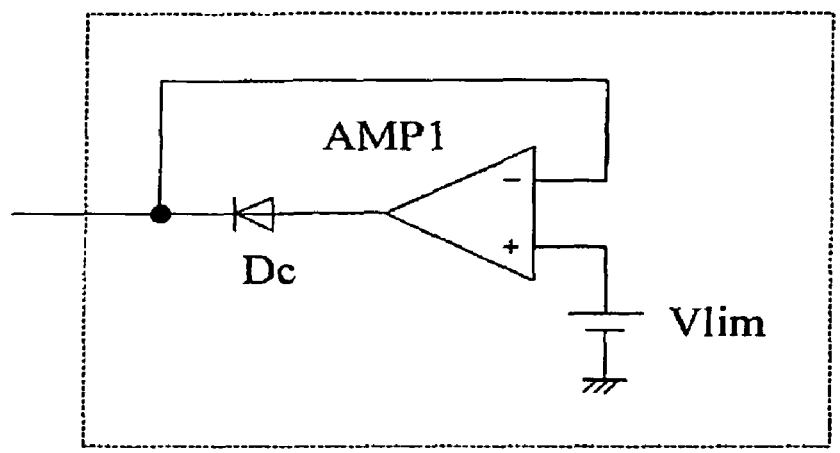
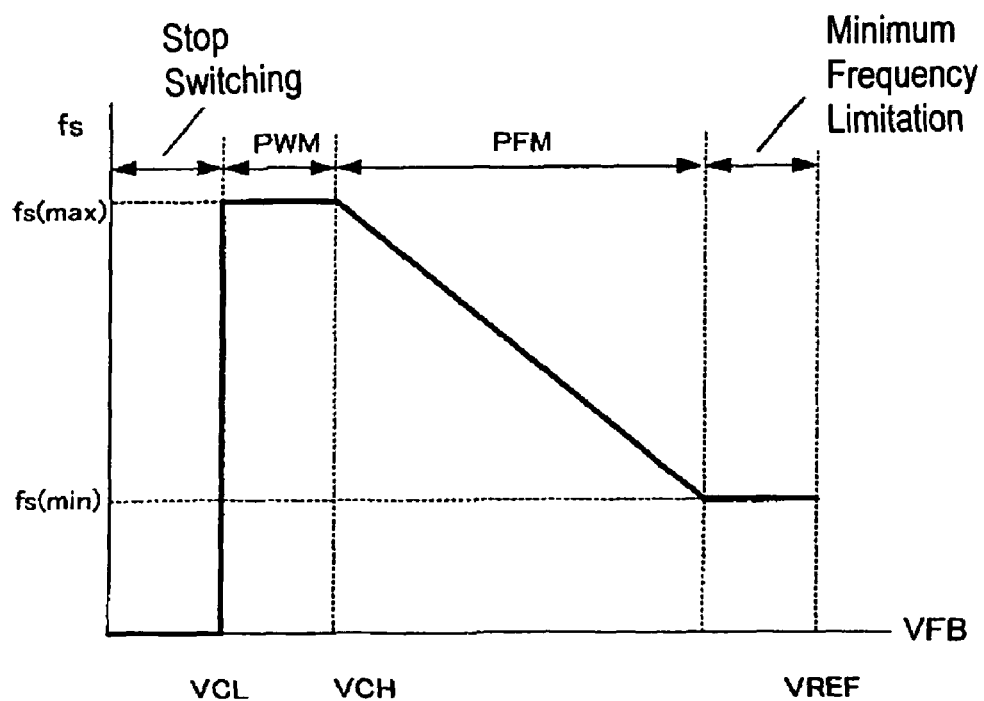
Fig. 6

RESONANCE-TYPE POWER SUPPLY WITH IMPROVED CONVERTION EFFICIENCY

BACKGROUND OF THE INVENTION AND RELATED ART STATEMENT

The present invention relates to a switching power supply that facilitates obtaining a stable DC output from a DC power supply. Specifically, the present invention relates to a technique that facilitates improving the conversion efficiency of a resonance-type power supply.

For the countermeasures against global warming, it has been required recently to reduce the electric power consumption of electrical equipments. Especially, it has been an important problem to improve the conversion efficiencies of switching power supply apparatuses incorporated in almost-all the electrical equipments.

Among switching power supply apparatuses, various resonance-type power supply apparatuses have been proposed, since the resonance-type power supply apparatuses are advantageous for improving the conversion efficiencies thereof and for reducing electromagnetic interference (herein after referred to as "EMI") (cf. the following Patent Documents 1 and 2).

FIG. 9 is a block diagram showing a circuit configuration similar to the circuit configuration of a conventional switching power supply described in the following Patent Document 1. The operations of the switching power supply shown in FIG. 9 will be described with reference to the wave chart described in FIG. 10.

Shown in FIG. 9 are DC power supply Vin; switching devices Q1 and Q2 such as MOSFET's; insulation transformer T1; leakage inductance Lr; exciting inductance Lm; primary winding Np1; secondary windings Ns1 and Ns2; inductor Lz; capacitors Cr and Co; rectifying diodes D1 and D2; load Ro; control circuit Cont; error amplifying circuit E/A; resistors R1 through R3; shunt regulator IC1; photocoupler PC1; gate-pulse control circuit P.Cont; and oscillator circuit VCO.

Insulation transformer T1 is shown in FIG. 9 by an equivalent circuit including leakage inductance Lr, exciting inductance Lm, primary winding Np1, and secondary windings Ns1 and Ns2. A series circuit including MOSFET's Q1 and Q2 is connected between the positive and negative terminals of DC power supply Vin. A series circuit including inductor Lz, primary winding Np1 of insulation transformer T1, and capacitor Cr is connected in parallel to MOSFET Q2. MOSFET's Q1 and Q2 are turned on and off alternately with a dead time Td interposed between the adjacent ON-periods of MOSFET's Q1 and Q2. By switching on and off MOSFET's Q1 and Q2 as described above, the voltages generated across secondary windings Ns1 and Ns2 in insulation transformer T1 are rectified and smoothed by diodes D1, D2 and capacitor Co to obtain a DC output Vo. Inductor Lz may be omitted by employing leakage inductance Lr of insulation transformer T1 in substitution for inductor Lz. The series circuit including inductor Lz, primary winding Np1 of insulation transformer T1, and capacitor Cr may be connected in parallel to MOSFET Q1, instead of MOSFET Q2 without any problem.

Control circuit Cont is formed of error amplifying circuit E/A and gate-pulse control circuit P.Cont that controls the gate pulses for MOSFET's Q1 and Q2. Error amplifying circuit E/A amplifies the error between the signal obtained by dividing the DC output Vo with resistors R1 and R2 and the reference voltage preset in shunt regulator IC1. Error amplifying circuit E/A insulates the amplified error through photocoupler PC1 and transmits the insulated signal to gate-pulse control circuit P.Cont. Gate-pulse control circuit P.Cont includes oscillator circuit VCO that changes the frequency thereof in response to the amplified and isolated error signal FB and gate-pulse generator circuit G.Cont that outputs gate pulses G1 and G2. In detail, gate-pulse generator circuit G.Cont receives the output from oscillator circuit VCO and outputs the gate pulses G1 and G2, having the same pulse width, alternately with the dead time Td interposed between the adjacent gate pulses G1 and G2. For controlling the output voltage Vo at a certain value, the oscillation frequency of oscillator circuit VCO is increased as the output voltage Vo exceeds the set voltage to the higher side and decreased as the output voltage Vo exceeds the set voltage to the lower side.

The following Patent Document 1 describes that the switching frequencies of MOSFET's Q1 and Q2 will be prevented from changing under any load condition including a no-load condition and a heavy load condition, if the ON-period of MOSFET's Q1 and Q2 is set to be longer than the half-wave period of the series resonance current that flows through a series resonance circuit formed of inductor Lz, leakage inductance Lr, and capacitor Cr.

In this case, there exist two periods Ta and Tb in the current wave forms IQ1 and IQ2 of MOSFET's Q1 and Q2 as shown in FIG. 10. In the period Ta, a series resonance current flows through the series resonance circuit formed of inductor Lz, leakage inductance Lr, and capacitor Cr. In the period Tb, a series resonance current flows through a series resonance circuit formed of inductor Lz, leakage inductance Lr, exciting inductance Lm, and capacitor Cr. During the turn-ON of MOSFET Q1 or Q2, turn-ON losses are not caused, since MOSFET Q1 or Q2 is turned on after the voltage across MOSFET Q1 or Q2 has become zero (since MOSFET Q1 or Q2 conducts zero-voltage turn-ON). As a result, a power supply that exhibits a high conversion efficiency is obtained easily.

More conventional switching power supply apparatuses of a resonance type are described in the following Patent Documents 3 and 4. The switching power supply described in the following Patent Document 3 needs an auxiliary switch. The switching power supply described in the following Patent Document 3 does not distinguish between the control under a light load and the control under a heavy or moderate load. The switching device control under a heavy or moderate load described in the following Patent document 4 is conducted in the same manner as the switching device control according to the invention. However, the switching device control under a light load described in the following Patent document 4 is different from the switching device control according to the invention. In detail, the switching frequencies of the switching power supply apparatuses described in the following Patent Document 3 and 4 are higher than the switching frequency of the switching power supply according to the invention. The conversion efficiencies of the switching power supply apparatuses described in the following Patent Document 3 and 4 are lower than the conversion efficiency of the switching power supply according to the invention.

Patent Document 1: Japanese Patent No. 3080128
Patent Document 2: Japanese Patent No. 2734296
Patent Document 3: Japanese Unexamined Patent Application Publication No. 2001-314079
Patent Document 4: Japanese Unexamined Patent Application Publication No. 2006-204044

For making the switching power supply described in the Patent Document 1 conduct zero-voltage turn-ON, it is necessary to set the energy, released from inductor Lz, leakage inductance Lr and exciting inductance Lm when MOSFET's Q1 and Q2 are turned on, to be higher than the energy stored in the output capacitance (parasitic capacitance, not shown) of MOSFET Q1 and the output capacitance (parasitic capacitance, not shown) of MOSFET Q2. Therefore, exciting inductance Lm is set around a relatively small value of several hundreds pH to increase the turn-OFF current. Since the energy stored in exciting inductance Lm is not released to the secondary side, the energy stored in exciting inductance Lm causes reactive power. The conduction losses of MOSFET's Q1 and Q2 increase more as exciting inductance Lm is set to be smaller, causing a reduced conversion efficiency.

The period Tc in the wave chart described in FIG. 10 is a period, for which any current does not flow through rectifying diodes D1 and D2. Therefore, the peak values and the effective values of the diode currents ID1 and ID2 are relatively large, causing a reduced conversion efficiency.

In view of the foregoing, it would be desirable to obviate the problems described above. It would be also desirable to improve the conversion efficiency of a switching power supply so that the reactive power caused by the exciting inductance may be reduced, the losses caused in the rectifying diode may be reduced, and the switching frequency may be prevented from increasing.

Further objects and advantages of the invention will be apparent from the following description of the invention.

SUMMARY OF THE INVENTION

According to the subject matter of the appended first aspect, there is provided a switching power supply comprising:

a DC power supply including a positive terminal and a negative terminal;

a first series circuit formed of a first switching device and a second switching device connected in series to each other, the first series circuit being connected between the positive terminal and the negative terminal of the DC power supply;

a second series circuit formed of an inductor, the primary winding of an insulation transformer, and a capacitor, the second series circuit being connected in parallel to the first switching device or the second switching device, wherein the switching power supply turns on and off the first switching device and the second switching device alternately for generating a voltage across the secondary winding of the insulation transformer, the switching power supply rectifying and smoothing the voltage generated across the secondary winding of the insulation transformer for obtaining a DC output; and a control circuit controlling the ON and OFF of the first switching device and the second switching device, the control circuit including an error amplifying circuit, an oscillator circuit, a frequency fixing circuit, and a pulse width control circuit, where in the error amplifying circuit controls the voltage of the DC output at a constant preset value; the oscillator circuit controls a switching frequency corresponding to the output signal level of the error amplifying circuit; the frequency fixing circuit fixing the switching frequency; and the pulse width control circuit conducts pulse width control for making the ON-period of the first switching device and the ON-period of the second switching device equal to each other.

The control circuit controls the ON and OFF of the first switching device and the second switching device based on an output from the oscillator circuit when the output signal level of the error amplifying circuit is higher than a threshold level; and the control circuit makes the frequency fixing circuit fix the switching frequency when the output signal level of the error amplifying circuit is lower than the threshold level, the control circuit controlling the ON and OFF of the first switching device and the second switching device based on an output from the pulse width control circuit.

In the switching power supply described in the first aspect, the turn ratio of the primary winding and the secondary winding in the insulation transformer is set at a value that makes the ON-period of the first switching device and the second switching device shorter than the half wave period of a series resonance current that flows through a series resonance circuit formed of the inductor, the leakage inductance of the insulation transformer, and the capacitor (the subject matter of the second aspect).

In the switching power supply described in the first or second aspect, the frequency fixing circuit includes a reference voltage supply and a diode, the frequency fixing circuit compares the output signal level of the error amplifying circuit with the voltage of the reference voltage supply as the threshold level, and the frequency fixing circuit fixes the switching frequency based on the voltage of the reference voltage supply when the output signal level of the error amplifying circuit is lower than the voltage of the reference voltage supply (the subject matter of the third aspect).

According to the subject matter of the fourth aspect, there is provided a switching power supply comprising:

a DC power supply including a positive terminal and a negative terminal;

a first series circuit including a first switching device and a second switching device connected in series to each other, the first series circuit being connected between the positive terminal and the negative terminal of the DC power supply;

a second series circuit including an inductor, the primary winding of an insulation transformer, and a capacitor, the second series circuit being connected in parallel to the first switching device or the second switching device, wherein the switching power supply turns on and off the first switching device and the second switching device alternately for generating a voltage across the secondary winding of the insulation transformer, the switching power supply rectifying and smoothing the voltage generated across the secondary winding of the insulation transformer for obtaining a DC output; and a control circuit controlling the ON and OFF of the first switching device and the second switching device, the control circuit including an error amplifying circuit, an oscillator circuit, a frequency fixing circuit, and a pulse width control circuit, wherein the error amplifying circuit controls the voltage of the DC output at a constant preset value; the oscillator circuit controls a switching frequency corresponding to the output signal level of the error amplifying circuit; the frequency fixing circuit fixes the switching frequency in response to the output signal level of the error amplifying circuit lower than a threshold level; and the pulse width control circuit conducts pulse width control for making the ON-period of the first switching device and the ON-period of the second switching device equal to each other.

The turn ratio of the primary winding and the secondary winding in the insulation transformer is set at a value, wherein the ON-period of the first switching device and the second switching device is shorter than the half wave period of a series resonance current flowing through a series resonance circuit formed of the inductor, the leakage inductance of the insulation transformer, and the capacitor.

In the switching power supply described in any of the first aspect to fourth aspect, the ferrite core that constitutes the insulation transformer includes no air gap disposed thereon (the subject matter of the fifth aspect).

In the switching power supply described in any of the first aspect through fifth aspect, the oscillator circuit generates a saw-tooth wave, and the saw-tooth wave is used for a carrier signal for the pulse width control circuit (the subject matter of the sixth aspect).

According to the subject matters of the first, second, and fourth aspects and under the middle and heavy load conditions, the switching devices are made to operate in the frequency control region, in which the output voltage is adjusted by controlling the switching frequency of the switching devices. Moreover, the exciting inductance of the insulation transformer is set at a relatively large value, preferably more than 1 mH. The ON-period of the first and second switching devices is set to be shorter than the half wave period of a series resonance current flowing through a series resonance circuit formed of the inductor, the leakage inductance of the insulation transformer, and the capacitor. By the schemes described above, the reactive power caused by the exciting inductance is reduced and the losses of the rectifying diodes are reduced.

Under the no-load condition, a light load condition and a middle load condition, there is provided a pulse width control region, in which the switching frequency of the switching devices is fixed and pulse width control is conducted for making the ON-periods of the first switching device and the ON-periods of the second switching device equal to each other. The provision of the pulse width control region facilitates preventing the switching frequency from increasing.

According to the subject matter of the third aspect, the operations in the frequency control region and the operations in the pulse width control region are changed over without any hazard and the changeover operation is conducted stably.

According to the subject matter of the fifth aspect, any air gap is not formed on the ferrite core constituting the insulation transformer for maximizing the exciting inductance and for minimizing the reactive power. Since there exists no air gap, the leakage magnetic fluxes caused from the air gap can reduced and the eddy current loss caused in the ferrite core can be reduced According to the subject matter of the sixth aspect, the oscillator circuit generates a saw-tooth wave, and the saw-tooth wave is used also for a carrier signal for the pulse width control circuit. Therefore, the control circuit is simplified.

BRIEF DESCRIPTION OF THE DRAWINGS

FIG. 5 is a circuit diagram showing a modification of the frequency fixing circuit in the control circuit shown in FIG. 2.

FIG. 6 is a diagram describing the frequency characteristics of the control circuit shown in FIG. 2.

DETAILED DESCRIPTION OF PREFERRED EMBODIMENTS

Now the invention will be described in detail hereinafter with reference to the accompanied drawings which illustrate the preferred embodiments of the invention.

Figure 1:
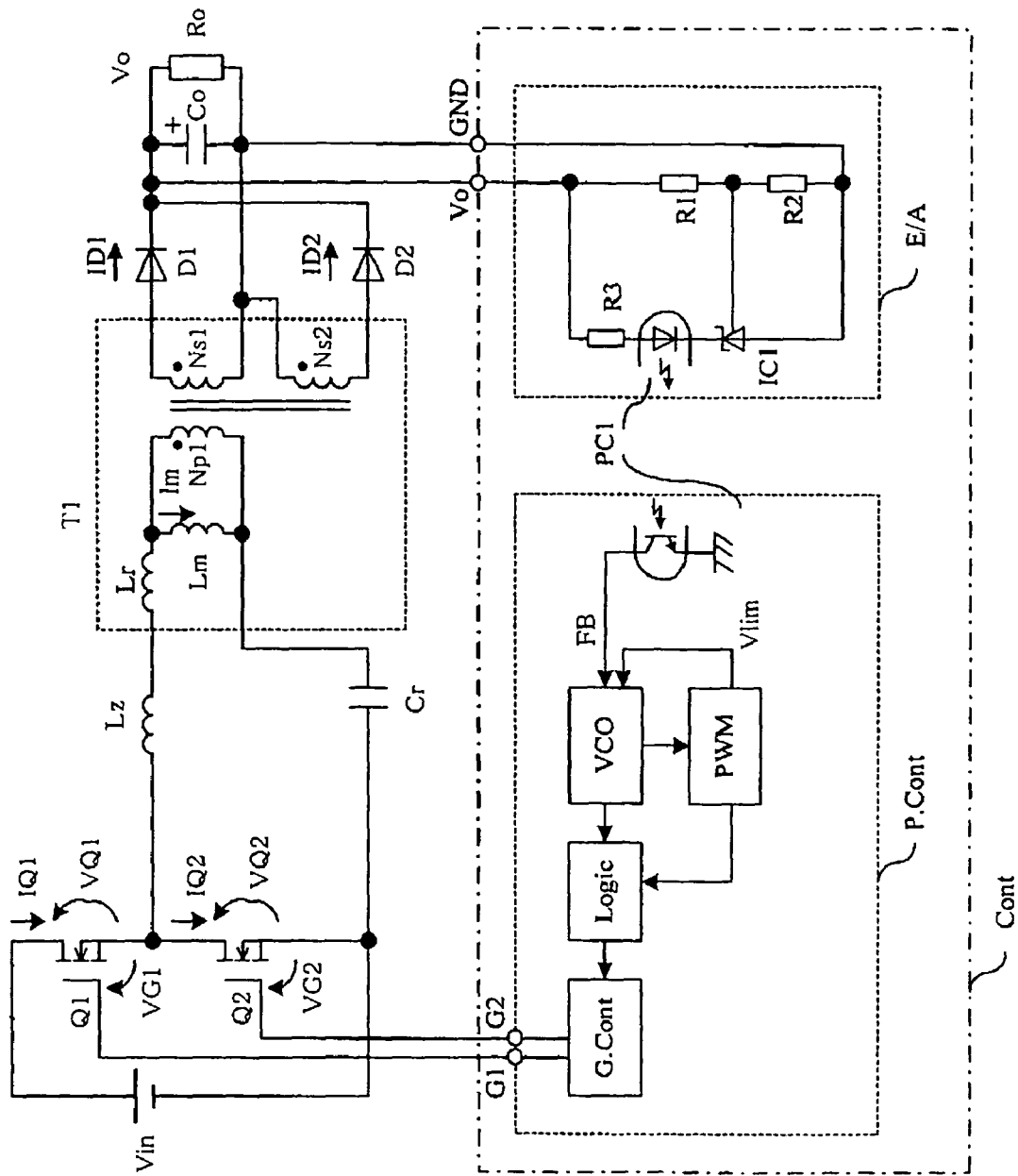
FIG. 1 is a block diagram of a switching power supply according to an embodiment of the invention.

FIG. 1 is a block diagram of a switching power supply according to an embodiment of the invention. The same reference numerals as used in FIG. 9 are used to designate the same constituent elements and their duplicated descriptions are omitted for the sake of simplicity.

Figure 9:
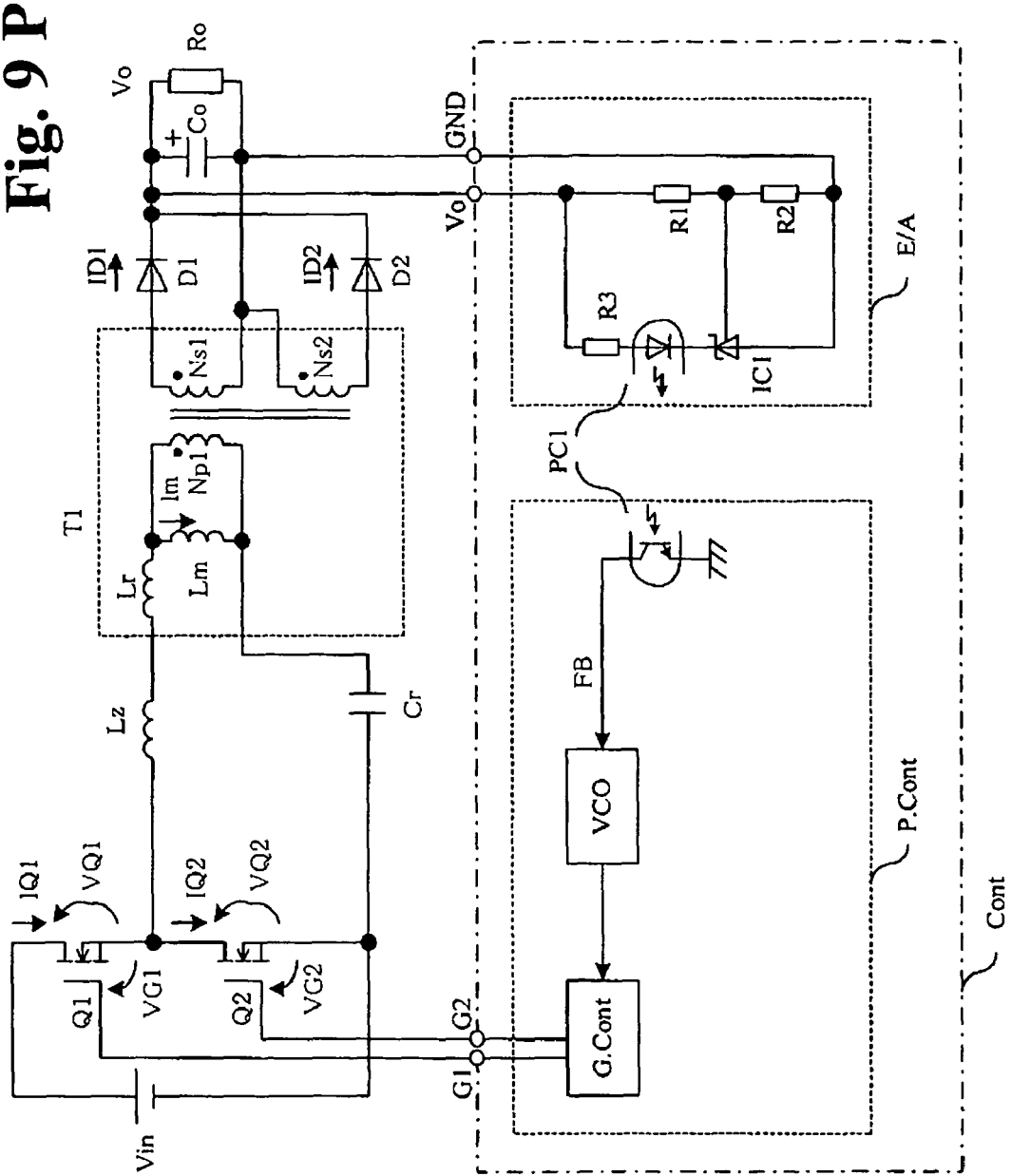
FIG. 9 is a block diagram showing the circuit configuration of a conventional switching power supply.
Figure 10:
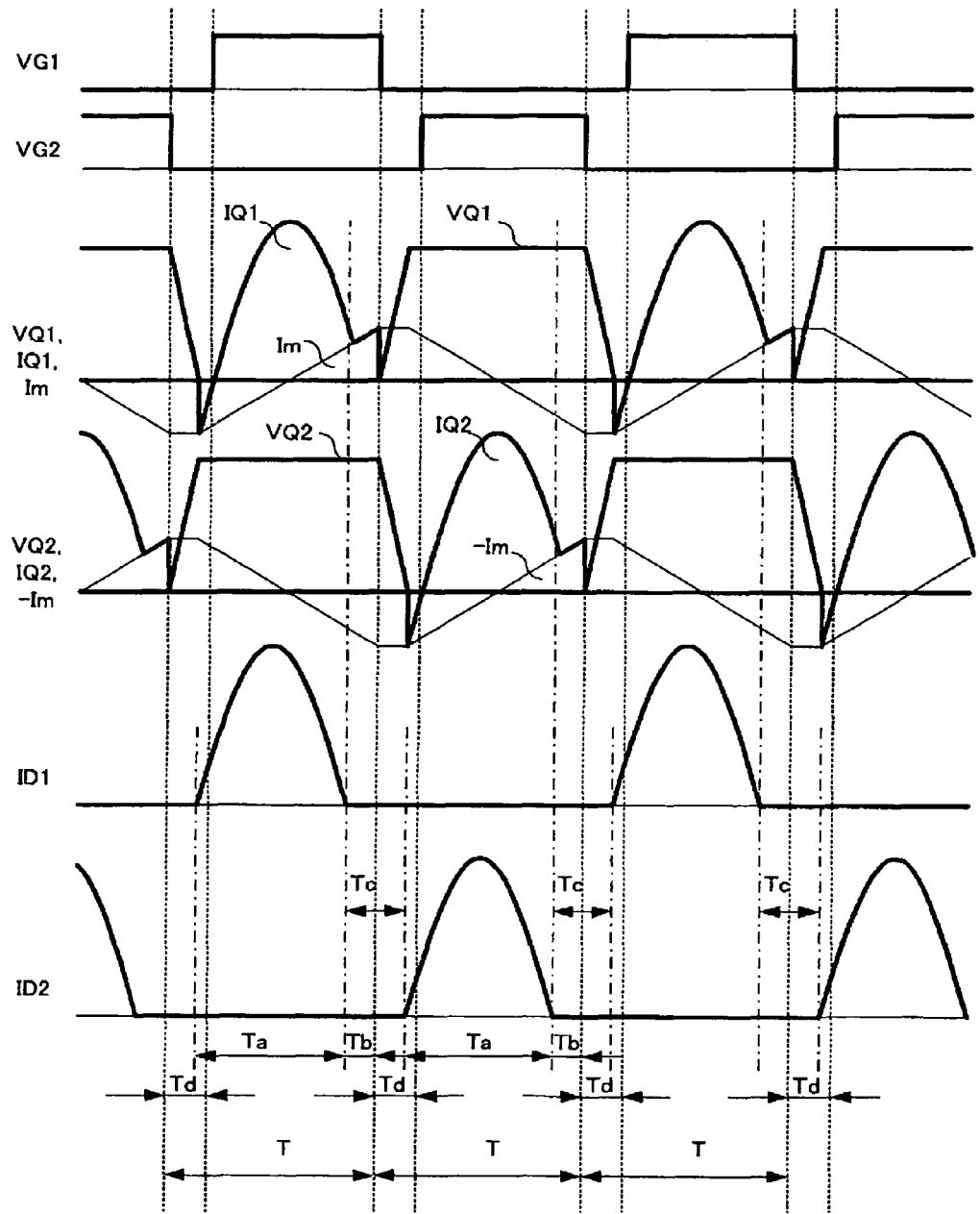
FIG. 10 is a wave chart describing the operations of the conventional switching power supply shown in FIG. 9.

The circuit configuration in FIG. 1 is different from the circuit configuration in FIG. 9 in that the circuit configuration in FIG. 1 includes pulse-width control circuit PWM and a frequency fixing circuit added for constituting gate-pulse control circuit P.Cont and logic circuit Logic for linking oscillator circuit VCO and pulse-width control circuit PWM with each other. The inductance value of exciting inductance Lm in insulation transformer T1 is set to be larger in FIG. 1 than that in FIG. 9. The reason for setting exciting inductance Lm as described above is as follows. The energy stored in exciting inductance Lm is not released to the secondary side of the transformer, causing reactive power. Therefore, by setting the exciting inductance value to be larger, the exciting current becomes smaller. As a result, the current that circulates on the primary side of the transformer is reduced and, therefore, the conduction losses are reduced.

For increasing exciting inductance Lm, the air gap spacing in the ferrite core constituting the transformer is shortened or the winding turns are increased.

Leakage inductance Lr of insulation transformer T1 may be employed in substitution for inductor Lz and inductor Lz may be omitted.

Figure 2:
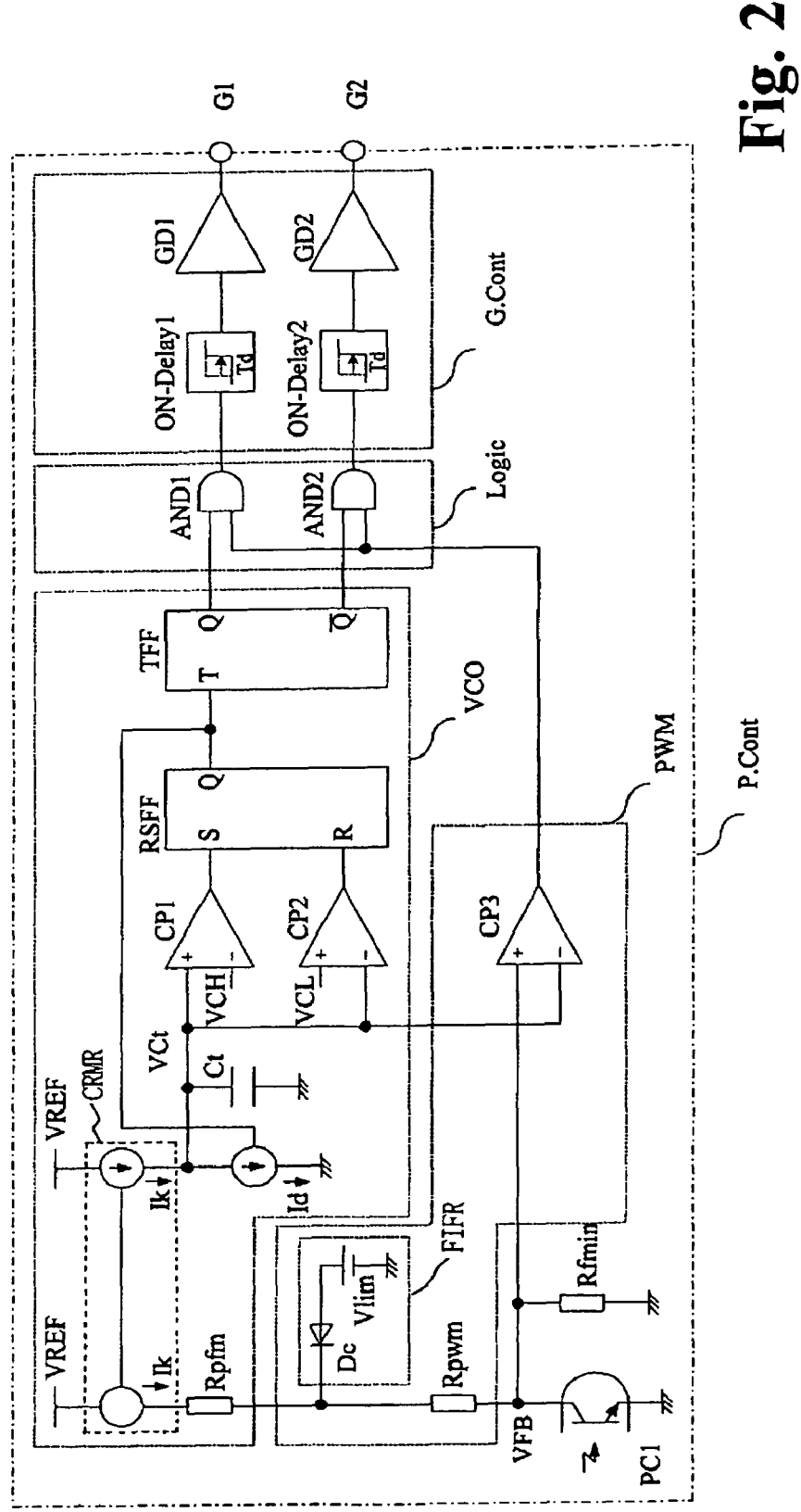
FIG. 2 is a block circuit diagram showing the configuration of the control circuit shown in FIG. 1.

FIG. 2 is a block circuit diagram showing a concrete configuration of the control circuit shown in FIG. 1.

In FIG. 2, control reference power supply VREF is shown. Oscillator circuit VCO includes current mirror circuit CRMR, constant current circuit Id, resistor Rpfm, capacitor Ct, comparators CP1 and CP2, RS flip flop circuit RSFF, and T flip-flop circuit TFF.

Pulse-width control circuit PWM includes frequency fixing circuit FIFR, comparator CP3, and resistor Rpwm. Frequency fixing circuit FIFR is formed of frequency setting reference voltage supply Vlim and diode Dc.

Photocoupler PC1 insulates amplified error signal (FB) outputted from error amplifying circuit E/A in FIG. 1, transmits the amplified error signal (FB) to gate pulse control circuit (P.Cont) and receives the amplified error signal (FB) as feedback signal VFB. And-gates AND1 and AND2 constitute logic circuit Logic. Gate driver circuit G.Cont is formed of dead-time setting circuits ON-delay 1 and ON-delay 2, and gate drivers GD1 and GD2.

Chattering prevention circuit CHT is disposed at the output terminal of pulse-width control circuit PWM. Chattering prevention circuit CHT shapes the waveform of the output from pulse-width control circuit PWM for preventing the output from pulse-width control circuit PWM from being unstabilized even when the feedback signal VFB is changed by noises and such causes.

Figure 3:
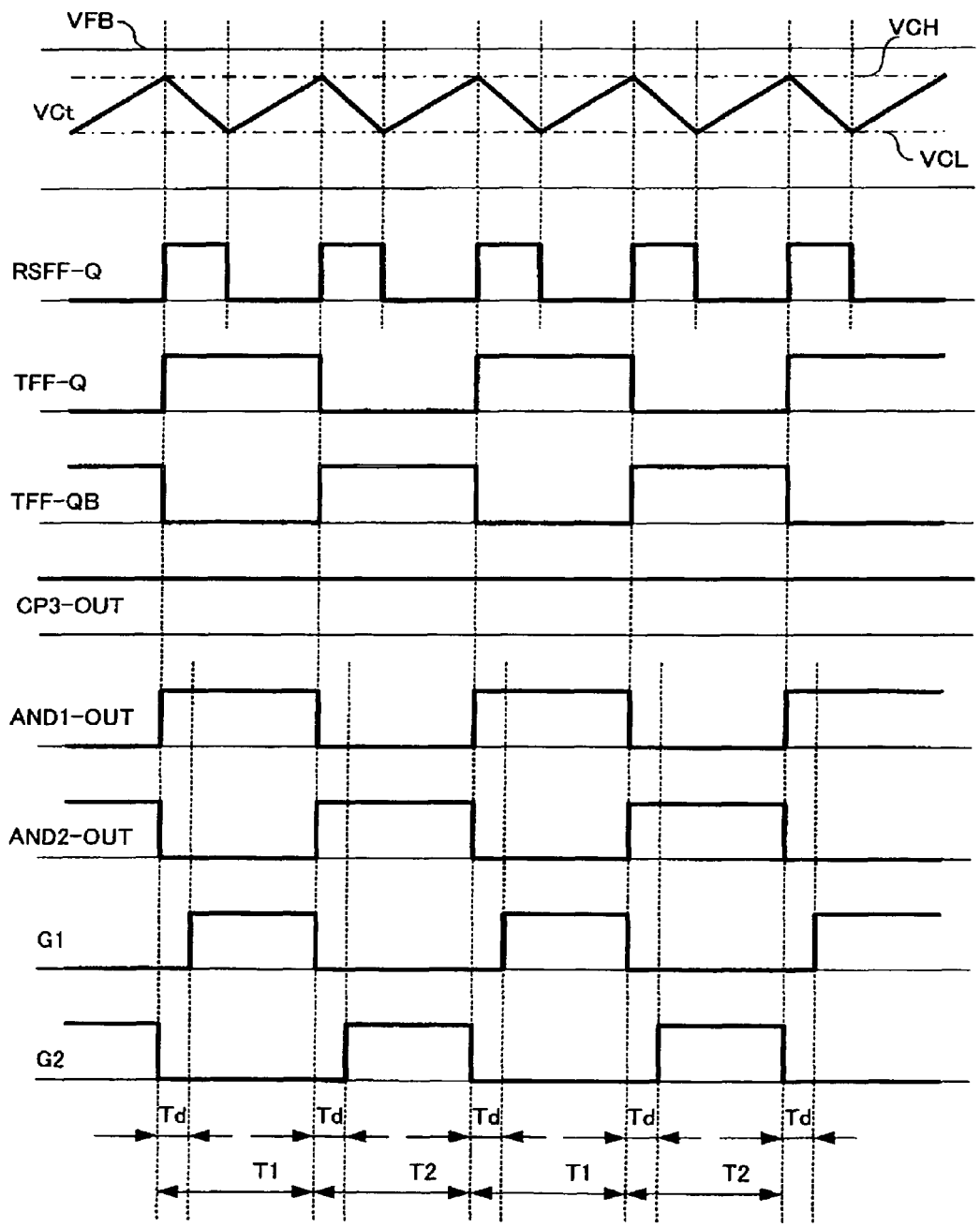
FIG. 3 is a wave chart describing the operations of the control circuit shown in FIG. 2 in the frequency control region.

Now the operations in the frequency control region in FIG. 2 will be described with reference to the wave chart described in FIG. 3.

Current mirror circuit CRMR charges capacitor Ct with a current equal to the current flowing through the transistor in photocoupler PC1. Since the feedback signal VFB is transmitted through photocoupler PC1, the current Ik flowing through current mirror circuit CRMR has a value corresponding to the feedback signal VFB. Although the feedback signal VFB is represented as a constant value for simplifying the descriptions in FIG. 3, the feedback signal VFB is changed in practice by load variations, input voltage fluctuations, and due to many other reasons. The wave chart in FIG. 3 describes the condition that the load is not light and the feedback signal VFB is higher than a capacitor voltage VCt.

Capacitor Ct is charged with the current Ik from current mirror circuit CRMR. As the voltage VCt of capacitor Ct rises to reach a high reference voltage VCH, RS flip-flop circuit RSFF is set. As RS flip-flop circuit RSFF is set, capacitor Ct is discharged with the current Id of constant current circuit Id. As the voltage VCt of capacitor Ct lowers to reach a low reference voltage VCL, RS flip-flop circuit RSFF is reset, constant current circuit Id is made to be OFF, and capacitor Ct is charged again with the current Ik. T flip-flop circuit TFF is triggered by the output signal from RS flip-flop circuit RSFF to conduct a toggle operation at a frequency obtained by dividing the charging and discharging frequency of capacitor Ct in half. By the operations described above, T flip-flop circuit TFF outputs pulses, the high signal-level period and the low signal-level period thereof are equal to each other. Therefore, the switching frequency is controlled in response to the load state while the ON-duty is controlled at 50% in this case.

The ON-duty is controlled at 50%, since the current shares of diodes D1 and D2 of MOSFET's Q1 and Q2 are equalized and the losses are minimized. When it is not necessary to fix the ON-duty at 50%, T flip-flop circuit TFF may be omitted, the output Q from RS flip-flop circuit RSFF is inputted to and-circuit AND1 and the inverted output Q output (Q bar) from RS flip-flop circuit RSFF is inputted to and-circuit AND2.

The voltage VCH for the reference voltage of comparator CP1 is set to be equal to the frequency setting reference voltage Vlim, which will be described later, such that VCH=Vlim. The low reference voltage VCL is set at the reference voltage for stopping the switching for further conducting the intermittent oscillation operations that will be described later. It is advantageous to set such that VCH=Vlim, since any shock is not caused at the changeover.

Frequency fixing circuit FIFR is formed of frequency setting reference voltage supply Vlim and diode Dc. Diode Dc includes an anode connected to frequency setting reference voltage supply Vlim and a cathode connected between resistors Rpfm and Rpwm. By setting the frequency setting reference voltage Vlim to be equal to the high reference voltage VCH for comparator CP1, the changeovers between the PFM control and the PWM control are conducted smoothly as the feedback signal VFB exceeds the frequency setting reference voltage Vlim to the higher side or to the lower side. As described later, the frequency setting reference voltage Vlim is a reference voltage for changing over the control methods of control circuit Cont corresponding to the magnitude of the feedback signal VFB. Irrespective of whether the changeover between the PFM control and the PWM control is conducted in the range where VFB≦Vlim, or in the range where VFB≧Vlim, any difference is not caused in the control.

Under a heavy load, the current that flows through the transistor in photocoupler PC1 reduces and the feedback signal VFB is higher than the frequency setting reference voltage Vlim. Diode Dc is OFF and capacitor Ct is charged with the current Ik from current mirror circuit CRMR. The charging and discharging period of capacitor Ct changes corresponding to the current that flows through the transistor in photocoupler PC1. Therefore, the frequency, which oscillator circuit VCO outputs, changes corresponding to the current that flows through the transistor in photocoupler PC1.

As the feedback signal VFB exceeds the frequency setting reference voltage Vlim (=VCH) to the higher side, the output from pulse width control circuit PWM (the output from comparator CP3) is set at the H-level independently of the voltage VCt of capacitor Ct. Therefore, the output signals from logic circuit Logic are the same with the output signals from T flip-flop circuit TFF. The ON-delay for the time Td is generated on the output signals from logic circuit Logic by delay time generator circuits ON-delay 1 and ON-delay 2. Therefore, the widths of the pulses outputted from gate drivers G1 and G2 are the same with each other and the frequencies of the pulses outputted from gate drivers G1 and G2 are controlled in response to the feedback signal VFB.

Figure 4:
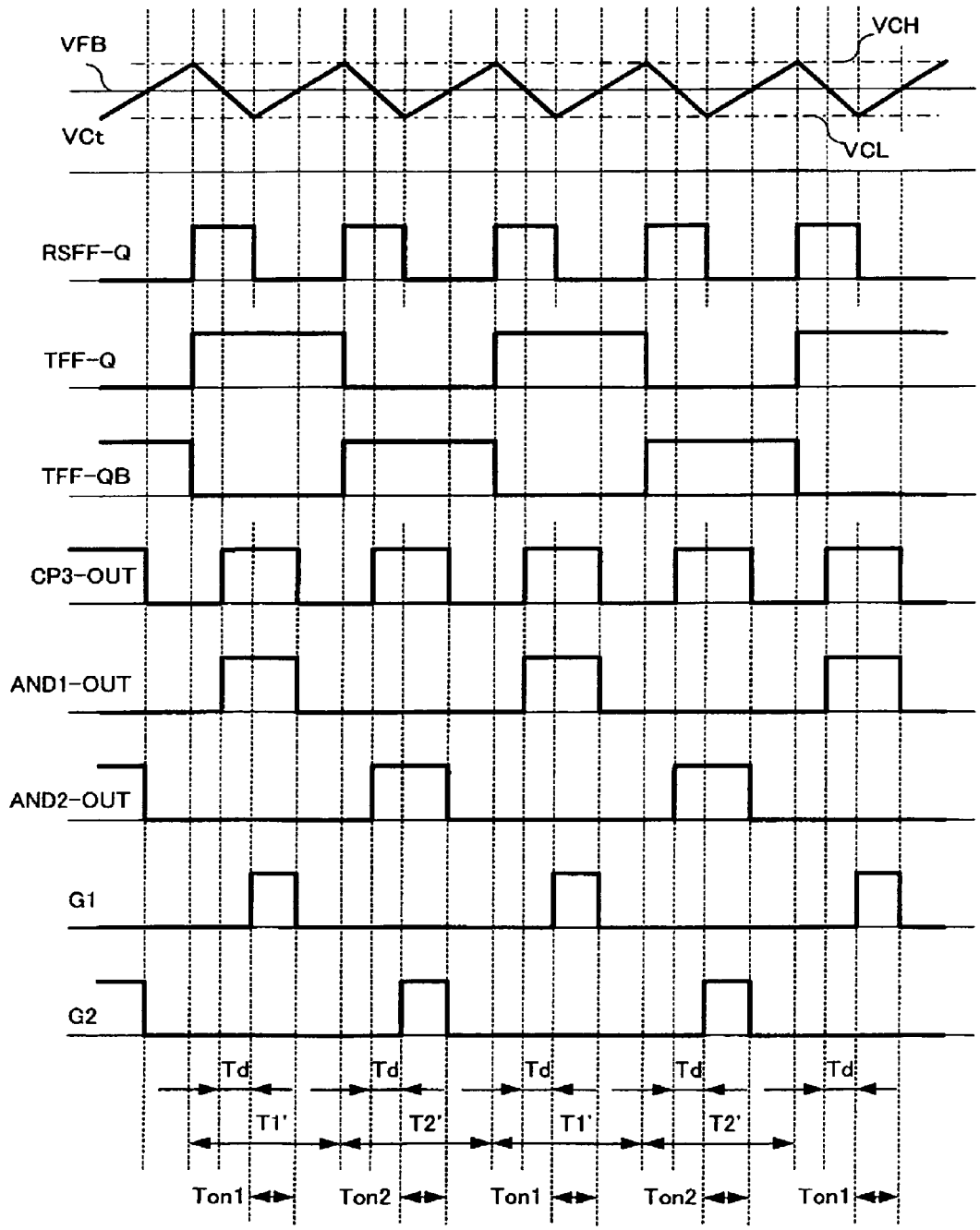
FIG. 4 is a wave chart describing the operations of the control circuit shown in FIG. 2 in the PWM control region.

Now the operations in the pulse width control region in FIG. 2 will be described with reference to the wave chart described in FIG. 4.

As a light load is connected and the feedback signal VFB exceeds the frequency setting reference voltage Vlim to the lower side, diode Dc becomes ON and a current flows through the transistor in photocoupler PC1 from frequency setting reference voltage supply Vlim via diode Dc and resistor Rpwm. On the other hand, the oscillation frequency of capacitor Ct will be constant as described below. Since the voltage difference between the control reference voltage VREF and the frequency setting reference voltage Vlim is constant, the current that flows through resistor Rpfm becomes constant. As a result, the current Ik that flows through current mirror circuit CRMR becomes constant and, therefore, the oscillation frequency of capacitor Ct becomes constant. An ideal diode circuit that uses operational amplifier AMP 1 as shown in FIG. 5 may be used for the frequency fixing circuit. As the feedback signal VFB exceeds the frequency setting reference voltage Vlim (=VCH) to the lower side, pulse width control circuit PWM compares the voltage VCt of capacitor Ct as a carrier signal with the feedback signal VFB in comparator CP3 to determine the widths of the gate pulses G1 and G2. The pulse width control is conducted so that the widths of the gate pulses G1 and G2 may be equal to each other.

FIG. 6 is a diagram describing the frequency characteristics of the control circuit shown in FIG. 2.

When feedback signal VFB is in the range between the low reference voltage VCL and the high reference voltage VCH, the control operations are in the pulse width control region (PWM). As the feedback signal VFB exceeds the high reference voltage VCH to the higher side, the control operations are in the frequency control region (PFM). In the frequency control region, the minimum value fs (min) of the switching frequency can be adjusted by the resistance value of resistor Rfmin connected to both ends of the transistor in photocoupler PC1. Under the close to no-load condition, switching is stopped as the feedback signal VFB exceeds the low reference voltage VCL to the lower side. As the output voltage Vo lowers below the preset voltage, the feedback signal VFB rises and the switching is resumed. Since an intermittent oscillation operation is conducted as the switching is resumed, the losses under a light load are further reduced.

It is preferable to set the frequency fixed in the pulse width control region at a frequency less affected by noises. By setting the frequency to be fixed to be lower than 150 kHz for example, noises may be reduced below the regulation value specified by the International Standard. If noises are prevented, the frequency to be fixed may be set to be higher (for example around 200 kHz). The switching frequency fixed at a high value is advantageous for reducing the transformer size.

Now the operations of a main circuit, to which the control circuit shown in FIG. 2 is applied, will be described below.

Figure 7:
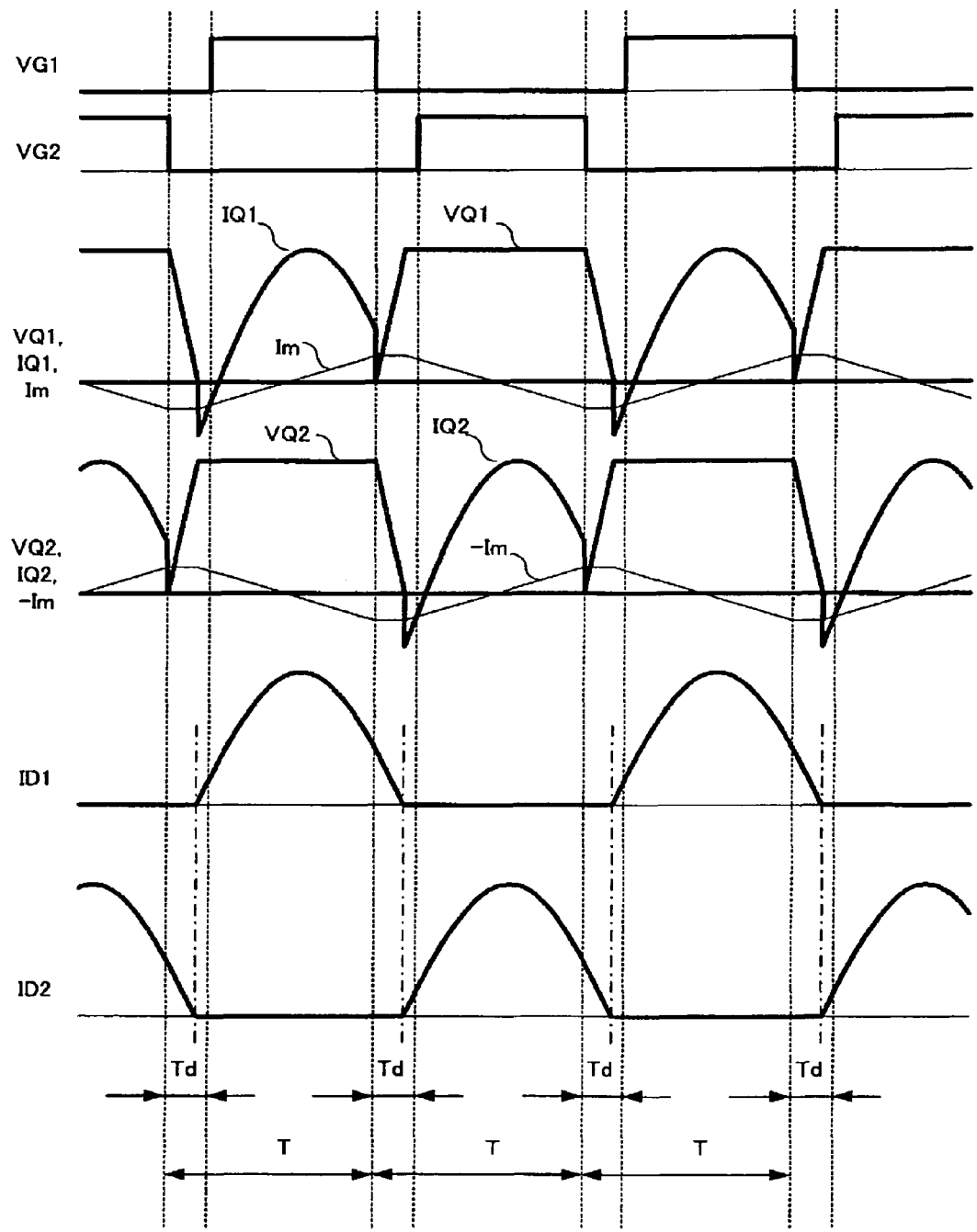
FIG. 7 is a wave chart describing the operations in the frequency control region of a main circuit, to which the control circuit shown in FIG. 2 is applied.

FIG. 7 is a wave chart describing the operations of the main circuit in the frequency control region.

The turn ratio of the primary and secondary windings in insulation transformer T1 is set so that the ON-periods of MOSFET's Q1 and Q2 may be shorter than the half-wave period of the series resonance current that flows through the series resonance circuit formed of inductor Lz, leakage inductance Lr, and capacitor Cr. By setting the ON-periods of MOSFET's Q1 and Q2 as described above, a current flows through rectifying diode D1 or D2 immediately after the current ID2 or ID1 of rectifying diode D2 or D1 becomes zero. Therefore, the peak values and the effective values of the currents ID1 and ID2 are reduced.

Now the method for setting the winding turns in insulation transformer T1 will be described below.

Figure 8:
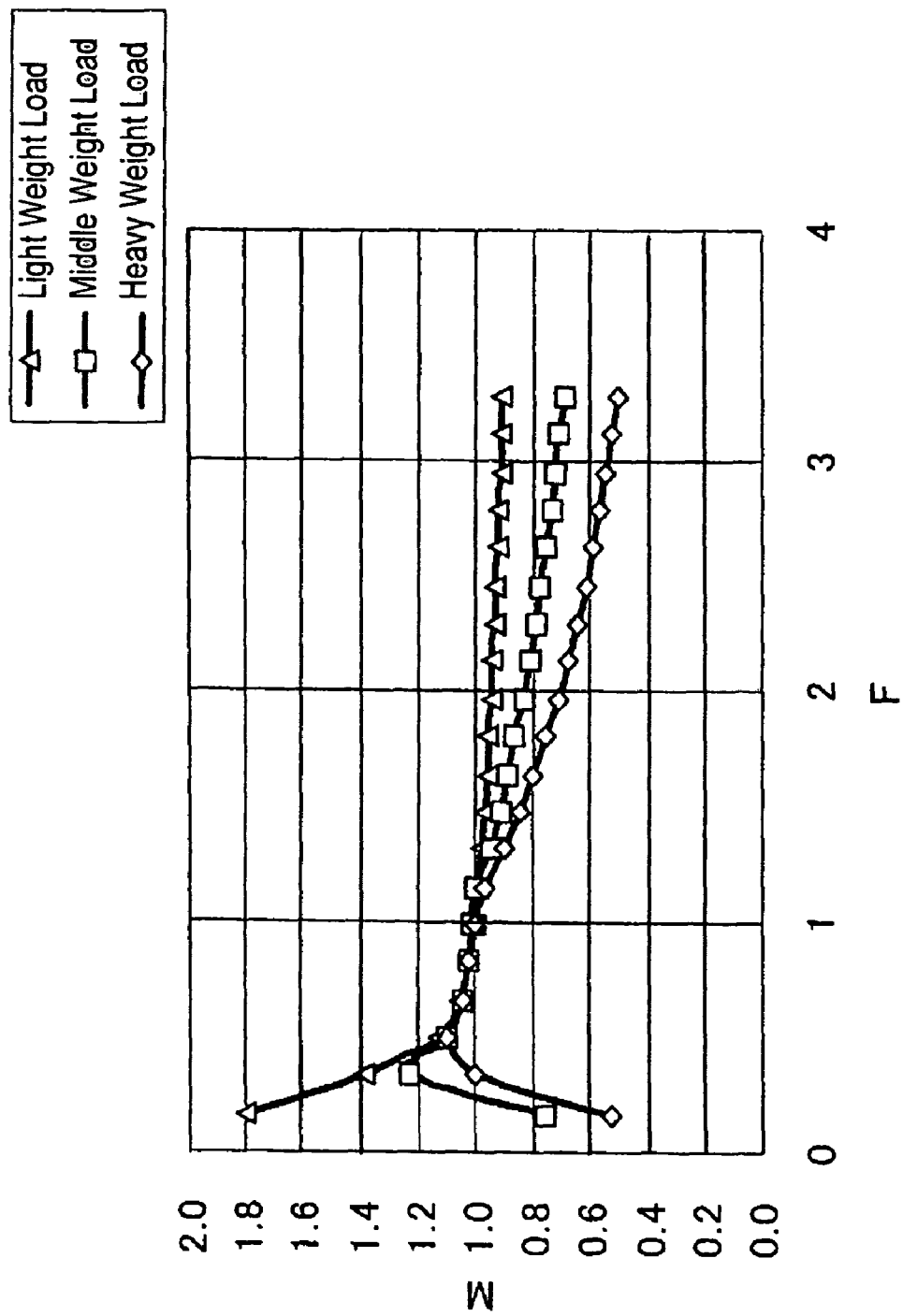
FIG. 8 is a set of curves relating to the normalized voltage conversion rate and the normalized switching frequency with load weights as parameters.

FIG. 8 is a set of curves relating to the normalized voltage conversion rate M and the normalized switching frequency F with load weights as parameters.

The normalized voltage conversion rate M is expressed by the following formula (1) using the DC power supply voltage Vin, the DC output voltage Vo, and the turn ratio n (=the primary winding turns Np/the secondary winding turns Ns) in insulation transformer T1.

$$M = n \cdot Vo/(0.5Vin) \quad (1)$$

The normalized switching frequency F is a ratio of the switching frequency fs to the resonance frequency fr and expressed by the following formula (2).

$$F = fs/fr \quad (2)$$

The resonance frequency fr is expressed by the following formula (3) using the inductance value Lz of inductor Lz, the leakage inductance value Lr of insulation transformer T1 and the static capacitance Cr of capacitor Cr.

$$fr = 1/[2\pi\{(Lz+Lr)Cr\}^{0.5}] \quad (3)$$

By setting the normalized voltage conversion rate M to be lower than 1, the normalized switching frequency F is set to be higher than 1 as FIG. 8 indicates and the ON-periods of MOSFET's Q1 and Q2 are set to be shorter than the half-wave period of the series resonance current that flows through the series resonance circuit formed of inductor Lz, leakage inductance Lr of insulation transformer T1, and capacitor Cr.

When variations are caused in the DC input voltage, it is necessary to set the normalized voltage conversion rate M to be lower than 1 at the minimum input voltage Vin (min) and the turn ration in insulation transformer T1 is obtained from the formula (1) and described by the following formula (4). Even if the turn ration is not set at a specific value, any problem will not be caused in the circuit operations.

$$n < 0.5Vin(\text{min})/Vo \quad (4)$$

Since the exciting current Im is superposed onto the series resonance current at the turn-OFF of MOSFET's Q1 and Q2, it will be possible for MOSFET's Q1 and Q2 to conduct zero-voltage-turn-ON, even if the value of exciting inductance Lm is large. Therefore, the reactive power is reduced.

As described above, the switching power supply according to the invention facilitates reducing the reactive power caused by the exciting inductance, reducing the losses of the rectifying diodes, preventing the switching frequency from increasing, and improving the conversion efficiency thereof.

The disclosure of Japanese Patent Application No. 2008-127545 filed on May 14, 2008 is incorporated herein by reference in its entirety.

While the invention has been explained with reference to the specific embodiments of the invention, the explanation is illustrative and the invention is limited only by the appended claims.

What is claimed is:

1. A switching power supply comprising:
a DC power supply comprising a positive terminal and a negative terminal;
a first series circuit comprising a first switching device and a second switching device connected in series to each other, the first series circuit being connected between the positive terminal and the negative terminal of the DC power supply;
a second series circuit comprising a primary winding of an insulation transformer, an inductor, and a capacitor, the second series circuit being connected in parallel to the first switching device or the second switching device, wherein the switching power supply turns on and off the first switching device and the second switching device alternately for generating a voltage across a secondary winding of the insulation transformer, the switching power supply rectifying and smoothing the voltage generated across the secondary winding of the insulation transformer for obtaining a DC output; and
a control circuit controlling ON and OFF of the first switching device and the second switching device, the control circuit comprising an error amplifying circuit, an oscillator circuit, a frequency fixing circuit, and a pulse width control circuit, wherein the error amplifying circuit controls a DC output voltage of the DC output at a constant preset value; the oscillator circuit controls a switching frequency corresponding to an output signal level of the error amplifying circuit; the frequency fixing circuit fixes the switching frequency to a predetermined frequency; and the pulse width control circuit conducts pulse width control for adjusting pulse widths of an ON-period of the first switching device and an ON-period of the second switching device;
wherein the control circuit controls the ON and OFF of the first switching device and the second switching device based on an output from the oscillator circuit when the output signal level of the error amplifying circuit is higher than a threshold level; and the control circuit makes the frequency fixing circuit fix the switching frequency when the output signal level of the error amplifying circuit is lower than the threshold level, the control circuit controlling the ON and OFF of the first switching device and the second switching device based on an output from the pulse width control circuit, and
wherein a turn ratio of the primary winding and the secondary winding in the insulation transformer is set at a value that makes the ON-period of the first switching device and the second switching device shorter than a half wave period of a series resonance current that flows through a series resonance circuit comprising the inductor, leakage inductance of the insulation transformer, and the capacitor.

2. The switching power supply according to claim 1, wherein the frequency fixing circuit comprises a reference voltage supply and a diode, the frequency fixing circuit compares the output signal level of the error amplifying circuit with a voltage of the reference voltage supply as the threshold level, and the frequency fixing circuit fixes the switching frequency based on the voltage of the reference voltage supply when the output signal level of the error amplifying circuit is lower than the voltage of the reference voltage supply.

3. The switching power supply according to claim 2, wherein the frequency fixing circuit fixes the switching frequency to the predetermined frequency by generating the voltage of the reference voltage supply as a constant voltage thereby maintaining an oscillation frequency of the oscillator circuit constant.

4. The switching power supply according to claim 1, wherein the pulse width control circuit conducts pulse width control for making the ON-period of the first switching device and the ON-period of the second switching device equal to each other.

5. The switching power supply according to claim 1, wherein the pulse width control circuit is configured to adjust output pulses from the oscillator circuit to be supplied to the first and second switching devices, so as to conduct the pulse width control when the output signal level of the error amplifying circuit is lower than the threshold level.

6. The switching power supply according to claim 5, wherein the pulse width control circuit is configured to adjust the output pulses from the oscillator circuit through a logic circuit connected to the pulse width control circuit and the oscillator circuit.

7. The switching power supply according to claim 1, wherein the output signal level of the error amplifying circuit represents an error between the DC output voltage and the constant preset value.

8. The switching power supply according to claim 1, wherein a ferrite core that constitutes the insulation transformer is formed without any air gap disposed thereon.

9. The switching power supply according to claim 1, wherein the oscillator circuit generates a saw-tooth wave, and the saw-tooth wave is used for a carrier signal for the pulse width control circuit.

10. A switching power supply comprising:
    a DC power supply comprising a positive terminal and negative terminal;
    a first series circuit comprising a first switching device and a second switching device connected in series to each other, the first series circuit being connected between the positive terminal and the negative terminal of the DC power supply;
    a second series circuit comprising an inductor, a primary winding of an insulation transformer, and a capacitor, the second series circuit being connected in parallel to the first switching device or the second switching device, wherein the switching power supply turns on and off the first switching device and the second switching device alternately for generating a voltage across a secondary winding of the insulation transformer, the switching power supply rectifying and smoothing the voltage generated across the secondary winding of the insulation transformer for obtaining a DC output; and
    a control circuit controlling ON and OFF of the first switching device and the second switching device, the control circuit comprising an error amplifying circuit, an oscillator circuit, a frequency fixing circuit, and a pulse width control circuit, wherein the error amplifying circuit controls a DC output voltage of the DC output at a constant preset value; the oscillator circuit controls a switching frequency corresponding to an output signal level of the error amplifying circuit; the frequency fixing circuit fixes the switching frequency in response to the output signal level of the error amplifying circuit being lower than a threshold level; the pulse width control circuit conducts pulse width control for making an ON-period of the first switching device and an ON-period of the second switching device equal to each other;
    wherein a turn ratio of the primary winding and the secondary winding in the insulation transformer is set at a value such that the ON-period of the first switching device and the second switching device is shorter than a half wave period of a series resonance current flowing through a series resonance circuit comprising the inductor, leakage inductance of the insulation transformer, and the capacitor.

11. The switching power supply according to claim 10, wherein the frequency fixing circuit comprises a reference voltage supply and a diode, the frequency fixing circuit compares the output signal level of the error amplifying circuit with a voltage of the reference voltage supply as the threshold level, and the frequency fixing circuit fixes the switching frequency based on the voltage of the reference voltage supply when the output signal level of the error amplifying circuit is lower than the voltage of the reference voltage supply.

12. The switching power supply according to claim 11, wherein the frequency fixing circuit fixes the switching frequency to a predetermined frequency by generating the voltage of the reference voltage supply as a constant voltage, thereby maintaining an oscillation frequency of the oscillator circuit constant.

13. The switching power supply according to claim 10, wherein the pulse width control circuit is configured to adjust output pulses from the oscillator circuit to be supplied to the first and second switching devices, so as to conduct the pulse width control when the output signal level of the error amplifying circuit is lower than the threshold level.

14. The switching power supply according to claim 10, wherein the output signal level of the error amplifying circuit represents an error between the DC output voltage and the constant preset value.

* * * * *

UNITED STATES PATENT AND TRADEMARK OFFICE
CERTIFICATE OF CORRECTION

PATENT NO. : 8,213,189 B2  
APPLICATION NO. : 12/453185  
DATED : July 3, 2012  
INVENTOR(S) : Yukihiro Nishikawa Page 1 of 1

It is certified that error appears in the above-identified patent and that said Letters Patent is hereby corrected as shown below:

Please change column 1, line 16 to 17, "in almost-all the electrical equipments." to --in almost all the electrical equipments.--.

Please change column 1, line 22 to 23, "herein after referred to as" to --hereinafter referred to as--.

Please change column 3, line 5, "hundreds pH to increase" to --hundreds µH to increase--.

Please change column 3, line 52, "where in the error amplifying" to --wherein the error amplifying--.

Please change column 8, line 13, "ON-delay 1and ON-delay 2." to --ON-delay 1 and ON-delay 2.--.

Please change column 11, line 38, "negative terminal;" to --a negative terminal;--.

Signed and Sealed this  
Twentieth Day of November, 2012

David J. Kappos  
*Director of the United States Patent and Trademark Office*